United States Patent [19]
Windes

[11] Patent Number: 5,214,313
[45] Date of Patent: May 25, 1993

[54] CIRCUIT FOR EXTENDING THE USEFUL DISCHARGE TIME OF LOAD DRIVING CAPACITORS

[76] Inventor: John A. Windes, 24656 Eloisa, Mission Viejo, Calif. 92691

[21] Appl. No.: 817,725

[22] Filed: Jan. 7, 1992

[51] Int. Cl.[5] .............................................. H02M 3/06
[52] U.S. Cl. ........................................ 307/109; 320/1; 363/123
[58] Field of Search ...................... 307/109, 110; 320/1; 323/266; 363/15, 16, 59, 60, 62, 123, 131

[56] References Cited

U.S. PATENT DOCUMENTS

| | | | |
|---|---|---|---|
| 2,734,162 | 1/1954 | Blanke | 363/59 |
| 3,076,130 | 1/1963 | Brunette et al. | 363/59 |
| 3,708,742 | 1/1973 | Gunn | 363/59 |
| 3,879,648 | 4/1975 | Hoffman, Jr. | 363/62 |
| 4,000,443 | 12/1976 | Lever | 363/59 |
| 4,127,895 | 11/1978 | Krueger | 363/86 |
| 4,406,624 | 9/1983 | Yamazaki | 363/59 |
| 4,433,282 | 2/1984 | Squires | 223/281 |
| 4,451,743 | 5/1984 | Suzuki | 307/110 |
| 4,460,953 | 7/1984 | Fukushima et al. | 363/62 |
| 4,533,986 | 8/1985 | Jones | 363/98 |
| 4,933,832 | 6/1990 | Schneider et al. | 363/143 |
| 5,051,881 | 9/1991 | Herold | 363/60 |

Primary Examiner—Steven L. Stephan
Assistant Examiner—Jeffrey Sterrett
Attorney, Agent, or Firm—H. Weissenberger

[57] ABSTRACT

In a capacitor-based energy storage system, in which the capacitor charging voltage is on the same order of magnitude as the system output voltage, the time between recharges for a given energy release rate is extended by producing an intermediate regulated capacitor output of a voltage having a lower order of magnitude and then stepping that voltage back up to the system output voltage through the use of an inverter.

5 Claims, 2 Drawing Sheets

CIRCUIT FOR EXTENDING THE USEFUL DISCHARGE TIME OF LOAD DRIVING CAPACITORS

FIELD OF THE INVENTION

This invention relates to capacitor-based electric power storage systems, and more particularly to a system which utilizes a larger portion of the stored energy in order to lengthen the time between recharges of the capacitors.

BACKGROUND OF THE INVENTION

Electric power storage systems which use capacitors instead of batteries as the storage elements are not new. They have, however, found little practical application in high-power environments for a number of reasons. For one, the amount of energy storable in a battery was substantially larger than that storable in a capacitor; and for another, much of the energy stored in a capacitor was unusable because in a commercial power environment, the output voltage of a capacitor dropped to inadequate levels when only a relatively small portion of its stored energy had been expended.

The first problem has recently been resolved by the introduction of new types of capacitors which have a vastly increased energy storage capability without a corresponding increase in size. Nevertheless, storage systems based on these capacitors would still require relatively frequent recharging when charged from, e.g., a 440-volt supply and used to power a 220-volt device. Raising the charging voltage would be impractical because this would require additional insulation in the capacitors and make them bulky; and the output voltage cannot not be changed because it is dictated by the nature of the load.

SUMMARY OF THE INVENTION

The invention allows less frequent recharging of a commercial-voltage capacitive energy storage and release system by using its energy storage capacitors, through the use of voltage regulators having a low-voltage output, to provide a regulated input to an inverter at a voltage which is a small fraction of the capacitor charging voltage, and then using the inverter to step the voltage up to a commercial level. This allows the capacitors to discharge down to a much lower voltage than would be possible if they were used to drive the load directly through a voltage regulator with a commercial-level output. As a result, a substantially larger part of the energy stored in the capacitors is usable before the capacitors must be recharged. In a typical installation, the capacitor charging voltage might be 440 V DC; the inverter input might be 12 V DC; and the inverter output might be 220 V AC or DC.

DESCRIPTION OF THE PREFERRED EMBODIMENT

Figure 1:
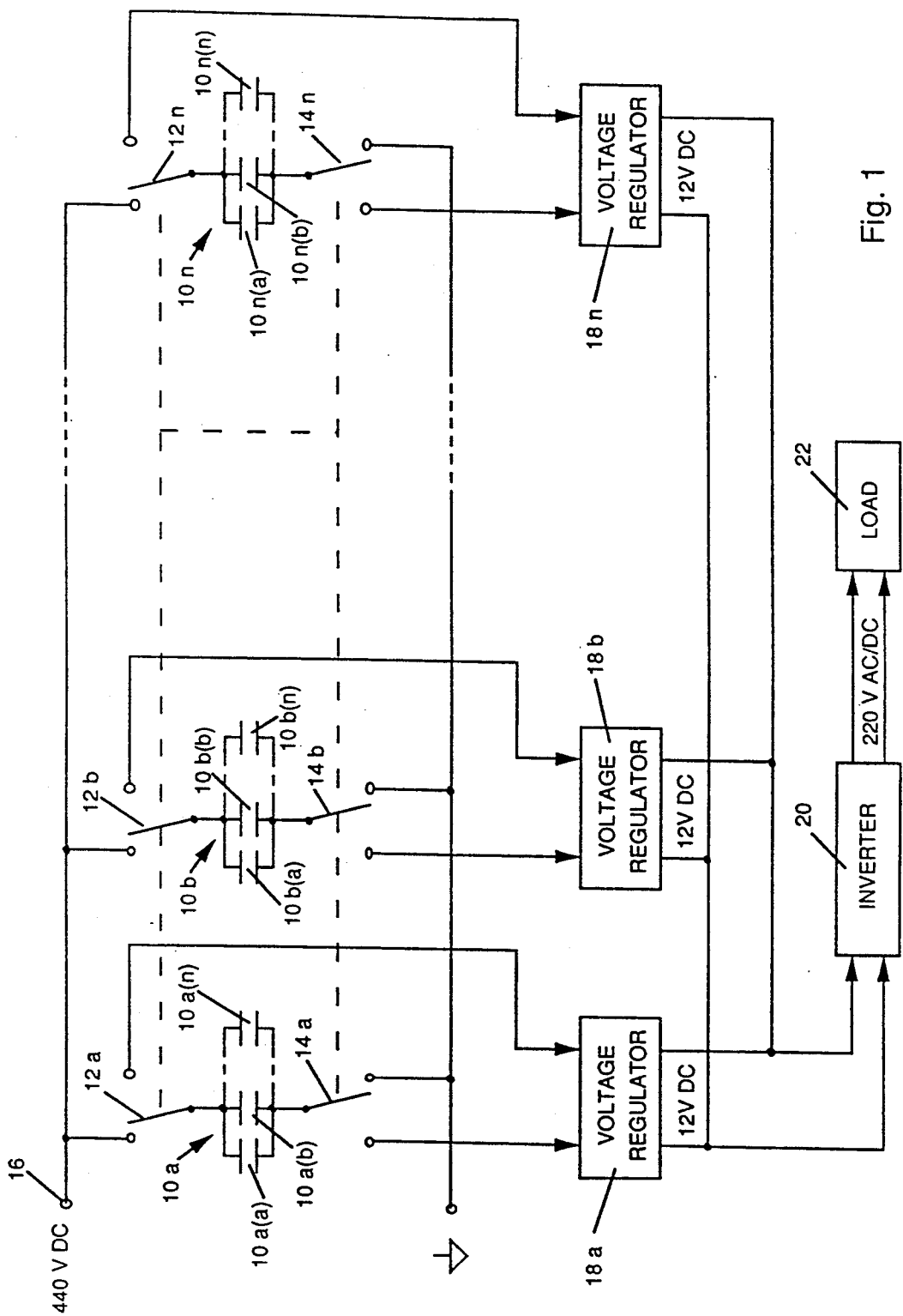
FIG. 1 is a circuit diagram, partially in block form, illustrating a preferred embodiment of the invention.

FIG. 1 shows the energy storage and release system of this invention. The system of FIG. 1 includes a set of capacitor banks $10a$ through $10n$, each containing a plurality of capacitive energy storage means such as capacitors $10a(a)$–$10a(n)$ through $10n(n)$. The present invention is useful with very high capacity capacitors which can sustain a high discharge. One example of such high capacity capacitors are activated carbon capacitors such as those recently proposed by Isuzu Corporation of Japan. These capacitors have the ability to put out a substantial amount of power, but their discharge cycle is comparatively short, so that full charge utilization is highly desirable.

Other high-capacity capacitor materials for which the present invention is useful include conductive polymers (e.g. conductive polyaniline) recently developed by the University of California at Santa Barbara. These conductive polymers have the ability to store a charge without undergoing a chemical reaction, and although they act like capacitors electrically, their storage capacity per unit volume compares favorably with that of an electrochemical battery.

Each of the banks $10a$ through $10n$ is individually connectable by switches $12a$–$12n$ and $14a$–$14n$ to either a high-voltage (e.g. 440 V DC) charging source 16 or to the input of a voltage regulator $18a$–$18n$. The switches $12a$–$12n$ and $14a$–$14n$ may be of any suitable conventional mechanical or electronic construction. The voltage regulators $18a$–$18n$ may be of any suitable conventional type or of the type illustrated in U.S. Pat. No. 3,708,742 to Gunn, as long as their output voltage is a small fraction of the charging source voltage. The arrangement of the capacitors in separately switched banks $10a$–$10n$ allows the system of this invention to continue functioning at reduced capacity if one of the capacitors shorts out or otherwise malfunctions. Likewise, the provision of a plurality of voltage regulators $18a$–$18n$ individually connected to capacitor banks $10a$–$10n$ improves reliability and allows the use of smaller, more readily available voltage regulator units.

The low-voltage (e.g. 12 V DC) outputs of the voltage regulators $18a$–$18n$ are connected in parallel to form the input to an inverter 20. The inverter 20 may be any of numerous commercially available inverters commonly used in mobile power applications and designed to convert 12 V DC to 110 or 220 V DC or AC. The output of the inverter 20 can then drive any desired commercial motor or other load 22.

In operation, the ganged switches $12a$–$12n$ and $14a$–$14n$ are initially thrown to the position shown in FIG. 1 so as to connect capacitors $10a(a)$–$10n(n)$ to the 440 V DC source 16 for charging. When it is desired to use the stored energy, switches $12a$–$12n$ and; $14a$–$14n$ are thrown to their other position, and their charge then constitutes the input to voltage regulators $18a$–$18n$.

As long as the load 22 is constant, the voltage regulators $18a$–$18n$ draw power from the capacitors $10a(a)$–$10n(n)$ at a substantially constant rate as long as the capacitor voltage exceeds the regulators' output voltage. The rate of power draw is typically maintained constant by drawing power form the capacitors in the form of a square wave whose duty cycle is variable to compensate for the capacitors' voltage drop as they discharge. This process is illustrated in the above-cited U.S. Pat. No. 3,708,742.

The output of each individual voltage regulator $18a$–$18n$ is 12 V DC. Inasmuch as each individual regulator has a limited current-producing capacity, the outputs of the voltage regulators $18a$–$18n$ are connected in parallel to provide a sufficient level of input current to inverter 20 to provide the required power to load 22. The output of inverter 20 may be, for example, a steady 110 AC which, to the load 22, is indistinguishable from regular commercial power.

When the voltage of capacitors $10a(a)-10n(n)$ drops down to 12 V, power delivery to the load 22 is stopped (conventional switching circuitry in the voltage regulators $18a-18n$ or the inverter 20 may be used to disconnect the voltage regulators from the inverter), and the capacitors $10a(a)-10n(n)$ need to be reconnected to the charging source 16 via switches $12a-12n$ and $14a-14n$.

Figure 2:
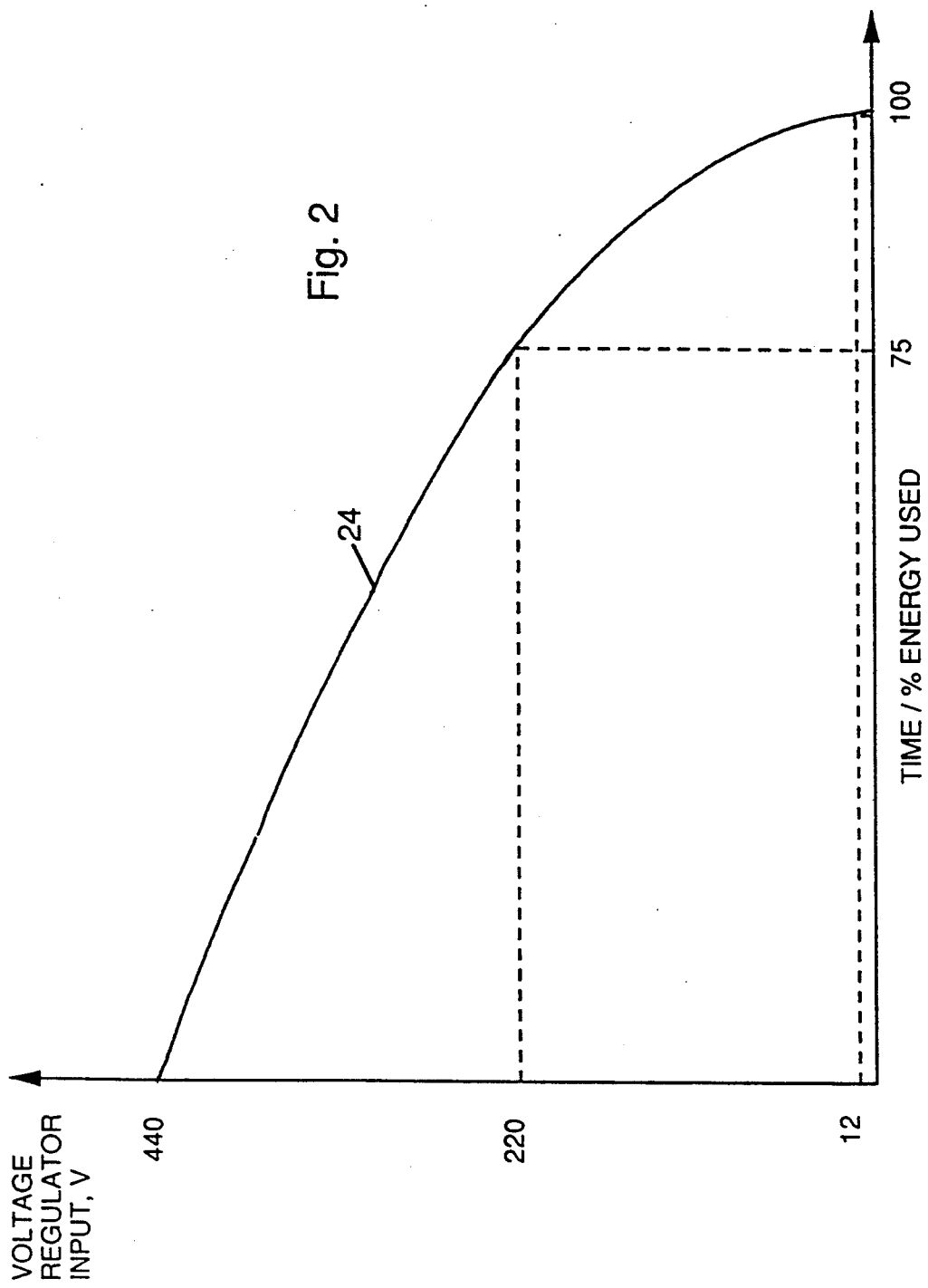
FIG. 2 is a time-amplitude diagram illustrating the operation of the invention.

FIG. 2 illustrates the advantage gained by the use of the invention. Curve 24 shows the output voltage of any individual capacitor bank $10a-10n$ as a function of time when energy is drawn therefrom at a constant rate. The energy stored in a capacitor is given by the formula $$E = \tfrac{1}{2}CV^2$$

wherein

E is the stored energy in Wsec or joules
C is the capacitor's capacitance in farads, and
V is the instantaneous capacitor voltage in volts.

Consequently, if, as discussed above, the voltage regulators $18a-18n$ draw power at a constant rate, the capacitors' voltage drop will follow the curve 24.

It will be seen that if the load 22 were driven directly through a voltage regulator whose output were 220 V, the capacitor banks $10a-10n$ would have to be recharged after only a little more than three-fourths of the time than they would if a 12 V regulator is used in accordance with the invention; in other words, the invention extends the time between recharges by more than 30%. Of course, the recharging time in the invention is longer because the capacitors are nearly totally discharged rather than half discharged, but that is of little consequence for the applications contemplated by the invention (e.g. the operation of equipment remotely from a suitable charging source), in which the critical parameter is the time between charge operations.

The invention thus makes it possible to fully utilize the advantages of solid-state circuitry in energy storage systems and to overcome for high-power applications the high weight and limited life inherent in electrochemical batteries. In addition, it allows a capacitor-based system to put out AC power if desired.

I claim:

1. A capacitor-based energy storage and release system comprising:
   a) capacitive energy storage means having a capacitor voltage thereacross when charged;
   b) voltage regulator means arranged to produce an output at an output voltage which is a small fraction of said capacitor voltage as long as said capacitor voltage is higher than said output voltage;
   c) switched means for selectably connecting said energy storage means to a source of relatively high charging voltage, and to the input of said voltage regulator means; and
   d) inverter means connected to said voltage regulator means and arranged to convert said output voltage to a substantially higher load operating voltage.

2. The system of claim 1, in which said energy storage means include a plurality of banks of capacitors connected in parallel, and said voltage regulator means include a plurality of voltage regulators, each capacitor bank being switchably connectable to the input of one of said voltage regulators, and the outputs of said voltage regulators being connected together in parallel.

3. The system of claim 2, in which said capacitor voltage is substantially 440 V DC, said output voltage is substantially 12 V DC, and said load operating voltage is substantially 110 or 220 V AC or DC.

4. The system of claim 1, in which said energy storage means are activated charcoal capacitors.

5. The system of claim 1, in which said energy storage means are capacitors using conductive polymers for energy storage.

* * * * *